(12) United States Patent  (10) Patent No.: US 8,554,814 B2
Qi et al.  (45) Date of Patent: Oct. 8, 2013

(54) RANDOM SIGNAL GENERATOR USING QUANTUM NOISE

(75) Inventors: Bing Qi, Toronto (CA); Hoi-Kwong Lo, Toronto (CA); Li Qian, Toronto (CA)

(73) Assignee: The Governing Council of The University of Toronto, Toronto (CA)

( * ) Notice: Subject to any disclaimer, the term of this patent is extended or adjusted under 35 U.S.C. 154(b) by 524 days.

(21) Appl. No.: 12/860,335

(22) Filed: Aug. 20, 2010

(65) Prior Publication Data

US 2012/0045053 A1  Feb. 23, 2012

(51) Int. Cl.
*G06F 1/02* (2006.01)
(52) U.S. Cl.
USPC .......................................... 708/255

(58) Field of Classification Search
USPC ........................................... 708/255
See application file for complete search history.

(56) References Cited

U.S. PATENT DOCUMENTS

| | | | |
|---|---|---|---|
| 6,609,139 B1 * | 8/2003 | Dultz et al. | 708/250 |
| 6,711,342 B2 * | 3/2004 | Pavlath et al. | 385/147 |
| 7,284,024 B1 * | 10/2007 | Trifonov et al. | 708/3 |
| 7,702,704 B2 * | 4/2010 | Muranaka | 708/250 |

* cited by examiner

*Primary Examiner* — Chuong D Ngo
(74) *Attorney, Agent, or Firm* — Norton Rose Fulbright Canada LLP

(57) ABSTRACT

Systems and methods for generating a random signal, based on quantum noise in the phase of two or more input signals. The generated output random signal has random variation in its intensity based on the quantum noise in the phases of the input signals.

29 Claims, 8 Drawing Sheets

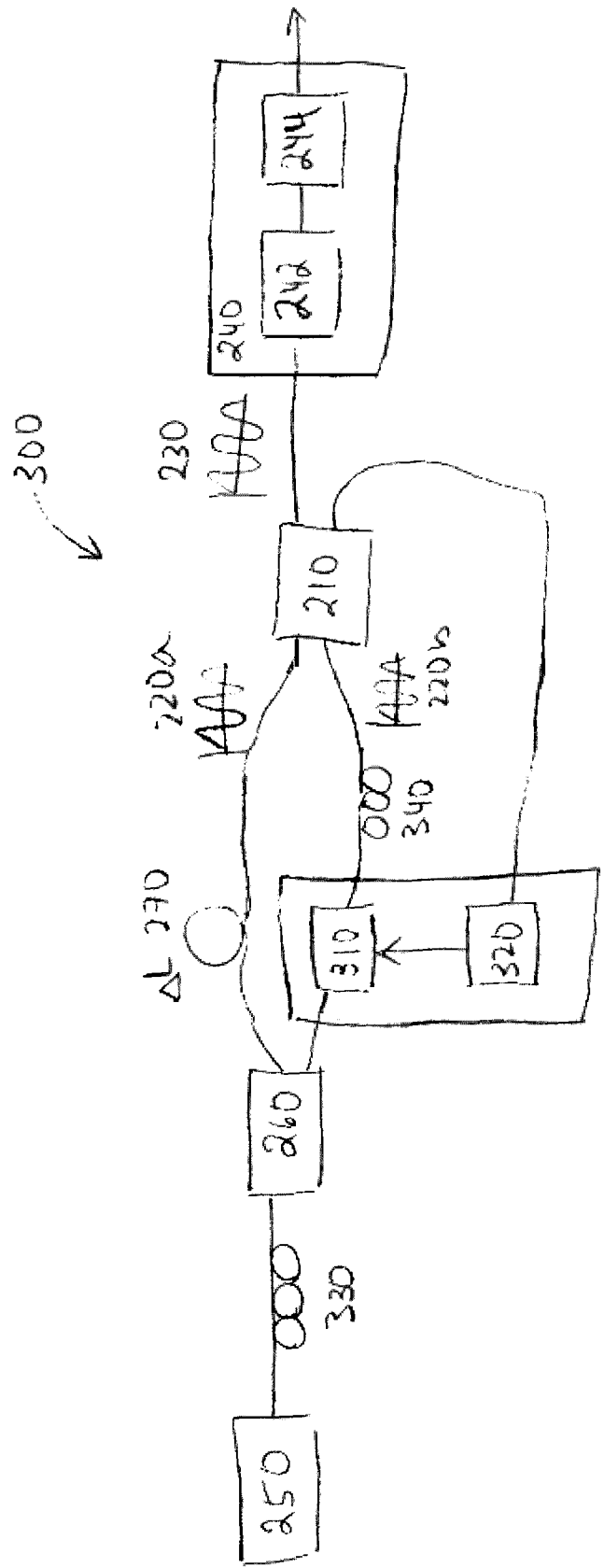

| Table 1 Diehard Test Results (500Mbits/s) | | |
|---|---|---|
| Statistical Test | P-Value | Result |
| BIRTHDAY SPACINGS | 0.845968 (KS) | Success |
| OVERLAPPING 5-PERMUTATION | 0.551420 | Success |
| BINARY RANK TEST for 31x31 matrices | 0.642062 | Success |
| BINARY RANK TEST for 32x32 matrices | 0.461672 | Success |
| BINARY RANK TEST for 6x8 matrices | 0.607744 (KS) | Success |
| BITSTREAM | 0.98987 | Success |
| Overlapping-Pairs-Sparse-Occupancy | 0.2373 | Success |
| Overlapping-Quadruples-Sparse-Occupancy | 0.1860 | Success |
| DNA | 0.1439 | Success |
| COUNT-THE-1's TEST | 0.919419 | Success |
| COUNT-THE-1's TEST for specific bytes | 0.751492 | Success |
| PARKING LOT | 0.199468 (KS) | Success |
| MINIMUM DISTANCE | 0.721783 (KS) | Success |
| 3D SPHERES | 0.405683 (KS) | Success |
| SQEEZE | 0.305844 | Success |
| OVERLAPPING SUMS | 0.246453 (KS) | Success |
| RUNS | 0.829651 (KS) | Success |
| CRAPS | 0.838686 | Success |
| KS: Kolmogorov-Smirnov TEST | | |

FIG. 7

RANDOM SIGNAL GENERATOR USING QUANTUM NOISE

TECHNICAL FIELD

The present disclosure relates generally to random signal generators, in particular random signal generators based on quantum noise, particularly quantum noise in the phase of a signal.

BACKGROUND

Random signals and numbers have been used in various branches of science and technology, including, for example, statistical analysis, computer simulation [1], cryptography [2], gaming, and on-line casinos, among others. Random signals may be generally referred to as random numbers, however it should be understood that random signals may not be numbers, but random numbers may be based on random signals.

An example use of random numbers is in quantum key distribution (QKD) [3], where truly random numbers are desirable for both quantum state preparation and quantum state detection. Truly random numbers have also been desirable in testing fundamental principles of physics [4, 5].

In practice, it is not easy to obtain high quality random numbers with proven randomness [6]. The use of a weak random number may have undesirable results. For example, in a cryptographic system, the application of a weak random number generator (RNG) may be undesirable, as evidenced by Goldberg and Wagner's attack on the Netscape SSL implementation [7].

A conventional pseudorandom generator may generate a long train of "random" bits from a short random seed by employing deterministic algorithms. The generated long bit string could meet a number of statistical measures, which may allow it to pass most or all existing randomness tests. However, the entropy of the long bit string may be ultimately determined by the length of the random seed. Generally, random numbers generated by deterministic algorithms may not be truly random.

A physical RNG may generate random numbers from unpredictable physical processes, including, for example, thermal noise [9], radioactive decay [10], and air turbulence [11], among others. For example, the Intel 80802 Firmware Hub chip included a hardware random number generator [12]. It may be useful to distinguish between two different types of physical random number generation processes, based on the source of randomness: a process based on the chaotic behavior of classical deterministic systems, which may be referred to as type-one randomness; and a process based on the probabilistic nature of fundamental quantum processes [13], which may be referred to as type-two randomness. The term "classical noise" may be used to refer to the unpredictability of a deterministic chaotic system and the term "quantum noise" may be used to refer to the fundamental uncertainty in a quantum process.

For example, a RNG based on atmospheric conditions can be treated as a type-one RNG, since the randomness mainly may originate from the absence of enough information about the weather system. In other words, the observed fluctuation can be treated as classical noise. However, the weather change, while seemingly unpredictable in the eyes of a layman, may be predictable to an expert equipped with super-computers.

Therefore, it may be desirable to provide a RNG based on quantum processes. Such a RNG may be useful in applications such as, for example, the generation of secure keys in a cryptographic system, or other secure exchange systems where the security relies on the true randomness of the key.

SUMMARY

In some aspects there is provided a system for generation of a random signal, the system comprising: a mixer for receiving at least two input signals, each input signal having quantum noise in its phase, the mixer interfering the input signals to generate at least one output signal; wherein the output signal has random variation in its intensity, the random variation of the output signal being derived from the quantum noise in the phases of the input signals.

In some example embodiments, the output signal is determined to fall within one of a plurality of value ranges, and a random signal is generated based on the determination.

In some example embodiments, the system may further comprise components or techniques for reducing the effects of phase drift, for example using phase stabilization or a filter for reducing effects of phase drift of at least one of the input signals, the phase drift being due to one or more environmental disturbances.

In some aspects, there is provided a method of generating a random signal, the method comprising: receiving at least two input signals, each input signal having quantum noise in its phase; and interfering the input signals to generate an output signal; wherein the output signal has random variation in its intensity, the random variation of the output signal being derived from the quantum noise in the phases of the input signals.

The present disclosure describes example embodiments of a random signal generation system, that may be relatively high speed, based on the quantum noise in the phase of a source signal. In some example embodiments, interference (e.g., in a delayed self-heterodyning system) of at least one source signal having quantum noise in its phase may be used to generate an output signal having a random variation in its intensity, based on the random quantum noise in the phase of the source signal. In some example embodiments, by reducing or removing the effects of phase drift (e.g., through the use of phase stabilization or through filtering) in the source signal, a random signal generation rate of about 500 Mbit/s or higher may be possible. The generated random signal may be relatively high quality, for example having passed conventional randomness tests, such as the DIEHARD tests.

BRIEF DESCRIPTION OF THE DRAWINGS

Reference will now be made to the drawings, which show by way of example embodiments of the present disclosure, and in which:

FIG. 3 shows another example embodiment of a system for generating a random signal;

FIG. 7 is a table illustrating results of testing on example signals generated by an example system for generating a random signal.

It will be noted that throughout the appended drawings, like features are identified by like reference numerals.

DETAILED DESCRIPTION

Figure 1:
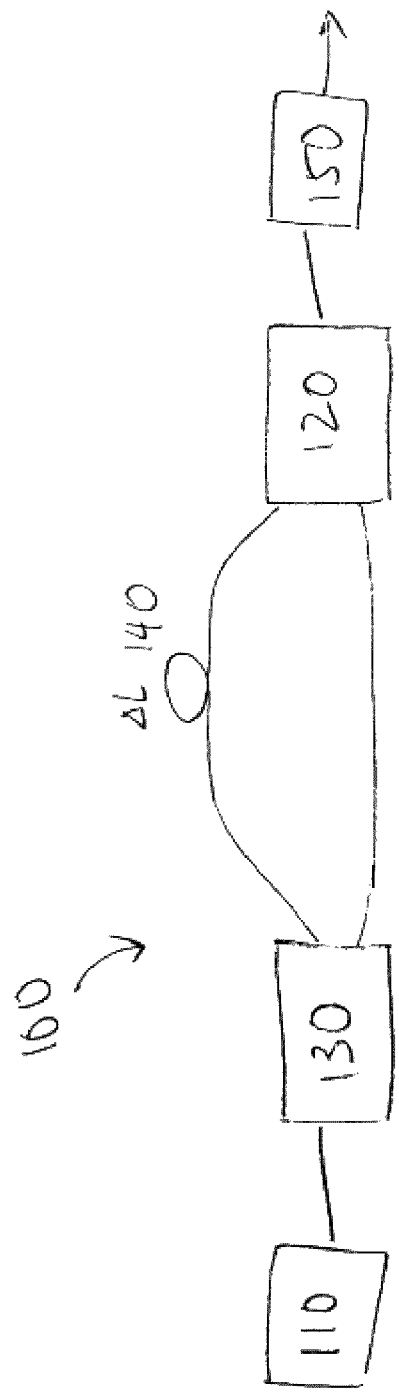
FIG. 1 shows an example system of a system for generating a random signal.

Currently, ultrahigh speed RNGs based on chaotic semiconductor lasers have been proposed and random number generation rates above the order of Gbit/s have been demonstrated [14]. In such examples, random signals or numbers may be generated from the amplitude noise of chaotic semiconductor lasers. However, random signals or numbers generated from such a deterministic chaotic system may not be suitably random for cryptographic applications, other secure exchange systems, statistical analyses, or computer simulations.

In other examples, a quantum RNG (QRNG), may be used to generate true random signals or numbers with suitable randomness. For example, a relatively simple QRNG may be constructed using a single photon source, a symmetric beam splitter and two single photon detectors [13]. Each photon has the same probability to be either transmitted or reflected by the beam splitter and thus which detector detects a photon may be completely unpredictable. This unpredictability may be due to the probabilistic nature of a projection measurement. The randomness of the result may be based on the fundamental laws of quantum mechanics.

An example source of quantum randomness may be the thermal noise in an electrical amplifier [9]. However, in practice, a high gain, broadband electrical amplifier also may exhibit classical noises which may dominate over the quantum noise. So far, the reported random number generation rate based on this scheme may be relatively slow, for example on the order of only a few Mbit/s [9].

Currently, existing example QRNGs may be based on performing single photon detections [13, 15] and may achieve random signal or number generation rates up to 16 Mbit/s [16]. This random signal or number generation rate may be too low for certain applications, such as high speed QKD systems that may be operated at GHz clock rates [17, 18], or other high speed cryptography applications, for example. Conventional high-speed QKD set-ups may use either a) deterministic random number generation algorithms or b) repeatedly a fixed pattern and, therefore, may not be unconditionally secure. Conventionally, the ultimate speed of these devices may be limited by the performance of the single photon detector (SPD), such as its dead time, efficiency, and/or afterpulsing probability, among other factors. For example, a typical silicon APD-SPD may have a dead time on the order of tens of ns [19], which suggests that the ultimate random signal or number generation rate based on this type of SPD may be in the order of tens of Mbit/s.

Another example quantum random signal or number generation scheme may be based on measuring the random field fluctuation of vacuum with a homodyne detector [20]. However, the fabrication of a high speed, shot noise limited homodyne detector may be a challenging task and a high speed QRNG (e.g., more than tens of Mbit/s) based on this scheme has not yet been possible.

The present disclosure describes example embodiments of a random signal generator based on measuring the quantum noise in the phase of a source signal, such as a signal from a laser (e.g., a single mode semiconductor laser, which may also be operating at a low intensity level near the lasing threshold [21]) or other optical source. In some example embodiments, where a laser is used as the signal source, the use of a low intensity operating level may help to ensure that the main contribution to the phase noise is from spontaneous emission (SE)[22], rather than from chaotic evolution of the macroscopic field [14]. In some example embodiments, a relatively high random signal generation rate may be achieved. In some example embodiments, a 500 Mbit/s or higher random signal generation rate may be achieved. Example embodiments of the present disclosure may be achieved using commercial off-the-shelf components. Although the present disclosure may refer to a random number generator, what is generated may not be a random number but rather a random signal (e.g., a digital random signal, comprising one or more random bits, or an analog random signal) that may be used, for example, as the basis for a random number or a random encryption key.

In general, a system for generation of a random signal, which may also be referred to as a random number, may include, for example, a mixer for receiving at least two input signals and generating an output random signal. The input signals may each have quantum noise in their respective phase (which may also be referred to as "quantum phase noise"), and the output random signal may have random variation in its intensity that is derived from the quantum noise in the phase of the input signals. For example, the output random signal may be produced by interfering the input signals or differencing the input signals, in order to extract the quantum noise in the phase of the input signals.

Example theory and example embodiments are described in the present disclosure. These are for the purpose of illustration only and are not intended to be limiting.

EXAMPLE SYSTEMS

For the purpose of understanding the present disclosure, an example system 100 and accompanying illustrative theory of operation is presented. This is for the purpose of illustration only and the present disclosure is not bound to any theory. The example system may be described with reference to FIG. 1.

In the example system 100, the input signals may be provided by an optical source, such as a laser 110. Although the following description refers to a laser 110 as a source of input signals, any signal source may be suitable, including, for example, any electromagnetic wave source, such as any optical source, including, for example, a broadband signal source (e.g., an incandescent light, a super luminescent diode, etc.) with a spectral filter or a narrowband signal source, or any other signal source that provides a signal having quantum noise in its phase. Although the example system 100 is described as having a signal source, the system 100 need not include the signal source, but may receive input signals from one or more external sources.

In the case of example system 100, in general, the fundamental linewidth of a single mode semiconductor laser may be due to the random phase fluctuation of the optical field [22]. Some studies have shown that the linewidth of a single mode injection diode laser may vary linearly with reciprocal laser output power [23, 24]. The fundamental laser linewidth may be attributed to the phase fluctuations arise from spontaneous emission [22]. For example, the phase noise of an InGaAsP DFB laser may also be described by the model described in [25].

In [22], the dependence of the linewidth of a single mode semiconductor laser on its output laser power may be described by $$\Delta f = \frac{v_g^2 h v g \eta_{sp} \alpha_m (1 + \alpha^2)}{8\pi P_0} \quad (1)$$

Here, $v_g$ is the group velocity, $hv$ is the energy of photon, $g$ is the gain of laser medium, $\eta_{sp}$ is the spontaneous emission factor, $P_0$ is the output power per facet. $\alpha_m$ is the facet loss which is defined as $\alpha_m \equiv g - \alpha_L$, where $\alpha_L$ is the waveguide loss of the laser. $\alpha_L \equiv \Delta n''/\Delta n'$, where $\Delta n'$ and $\Delta n''$ are the deviations of the real part and imaginary part of the refractive index from their steady-state values.

The behavior of such a signal may be described as follows [22]: each spontaneous emitted photon may have a random phase, which in turn may contribute a random phase fluctuation to the total electric field and may result in a linewidth broadening. This may be represented by the term "1" in the parentheses on the right hand side of (1). On the other hand, the same spontaneous emitted photon may also alter the amplitude of the laser field, which may result in a change of the carrier density. The change of carrier density further may trigger a change of n'', which is the imaginary part of the refractive index of the laser medium. Finally, the change in n'' has an associated change of the real part of the refractive index n', which may contribute to an additional phase shift of the laser field and linewidth broadening. This additional linewidth broadening may be described by the term $\alpha^2$ in the parentheses on the right hand side of (1).

The spontaneous emission may be considered a quantum mechanical effect and the corresponding phase noise may thus be considered quantum noise in the phase of the signal. However, in some examples, a practical laser source may also present additional classical (i.e., non-quantum) noises, such as occupation fluctuation [26] and/or 1/f noise [27], among others. These classical noises may be typically laser power independent [26, 27], for example. Thus, by operating a laser under certain power levels (e.g., at low operating levels), the ratio between classical noise and quantum noise may be reduced or minimized, and the noise properties may be mainly determined by quantum effects [26].

In some examples, the optical phase of input signals (e.g., from a laser source), having quantum noise in their phase, may be measured in an interferometric setup using a mixer 120. In this example system 100, the mixer 120 may be used to interfere the inputs to the mixer 120. In some example embodiments, the mixer 120 may be a fiber coupler. In some example embodiments, the mixer 120 may be provided as part of an interferometer. In the example system 100, the inputs to the mixer 120 may be derived from the same laser 110, for example using a fiber coupler 130 to split the laser signal. A time delay may be introduced between the two split inputs using, for example, a difference in fiber path length 140 from the splitter to the mixer input. In this manner, the output of the mixer 120 may be a self-heterodyne signal, which may be the output random signal. In some examples, instead of a positive interference of the inputs, the quantum noise in the phase may be measured using by taking the difference of the two inputs (e.g., using an interferometer that takes the negative of one of the two input signals, such as a differencer). For the example system 100, two input signals have been described. However, more than two input signals may be used as sources of quantum noise, for example more than two input signals may be used in interference.

In this example system 100, a time delayed self-heterodyning scheme may be employed to measure the linewidth of a semiconductor laser [24].

The electric field of a laser beam can be described by $$E(t) = E_0 \exp[i(\omega_0 t + \theta(t))] \tag{2}$$

where $\theta(t)$ represents the random phase fluctuation of the laser source.

The example system 100 may include a detector, in this case a photo detector (PD) 150, for sampling the self-heterodyne signal, for example in order to generate a digital random signal.

For example, the interference signal detected by the PD 150 may be described by $$S(t) \propto |E_0 \exp[i(\omega_0 t + \theta(t + T_d))] + E_0 \exp[i(\omega_0 t + \omega_0 T_d + \theta(t))]|^2 \tag{3}$$

Here $T_d$ is the time delay difference between the two input signals of the mixer 120 (e.g., using a Mach-Zehnder interferometer (MZI)), which can be determined by $T_d = n\Delta L/C$. $\Delta L$ is the path length imbalance (e.g., due to the fiber difference 140), n is the refractive index of fiber and C is the speed of light in vacuum.

After removing any DC background, equation (3) can be simplified as $$S(t) \propto \cos[\omega_0 T_d + \Delta\theta(t, T_d)] \tag{4}$$

where $\Delta\theta(t, T_d) \equiv \theta(t) - \theta(t + T_d)$.

In (4), the term $\Delta\theta(t, T_d)$ may represent the quantum noise in the phase of the laser source 110, while the term $\omega_0 T_d$ may represent the phase delay introduced by the path length difference 140. Typically, for a mixer 120 without phase stabilization, the term $\omega_0 T_d$ may not be a constant. This may be due to phase drift effects, which may result from environmental disturbances, including, for example, ambient temperature fluctuations, vibrations, electromagnetic noise, or other ambient noise, among others. This in turn may contribute additional classical phase noise. Generally, if the time delay difference $T_d$ is much larger than the coherence time of the laser 110, then $\Delta\theta(t, T_d)$ may present a substantially uniform distribution in the range of $[-\pi, \pi)$. Under this condition, the total phase $\omega_0 T_d + \Delta\theta(t, T_d)$ may be also uniformly distributed in the range of $[-\pi, \pi)$ regardless of the actual value of $\omega_0 T_d$.

Thus a digital random signal may be generated by sampling the output signal (referred to here as S(t), for example) using a sampler, which may be provided as part of a photo detector 150 or may be a separate component (e.g., an analog-to-digital converter). The sampler may have a relatively fast sampling rate, in order to achieve high speed random number generation, and may sample the output at fixed or variable time intervals ($T_S$) to generate one or more sample values $\check{S}(t_i)$ at one or more times $t_i$.

The value of the sample(s) may be determined to fall into one of two or more predefined ranges (e.g., positive or negative in value, above or below a threshold value, one of several value ranges, etc.) in order to generate the random bits and/or random numbers. In some examples, this determination may be carried out using hardware component such as, for example, one or more comparators. Where this determination is carried out using hardware component(s), this determination may be carried out on the analog output signal (i.e., before any sampling take place), and provide an analog output, which may be subsequently sampled. That is, the sampler may be provided before or after any comparator(s). In other examples, this determination may be carried out on the sample(s) using a processor (which may be part of the detector) executing appropriate software instructions.

For example, in order to generate a random binary signal, the value of each sample may be determined to be either positive or negative and a single "1" or "0" bit may be generated corresponding to the determined sign. Alternatively, the value of each sample may be compared against a threshold value (e.g., a pre-calculated average or running average of the signal value) and the random bit value may be generated based on whether the sample value is above or below the threshold.

In some example embodiments, the sample may be categorized to fall into more than two value ranges (also referred to as bins). For example, in order to generate a set of random 2-bits from a single sample, the sample may be determined to fall into one of 4 value ranges, each value range having an equal probability of occurrence, each value range being associated with a 2-bit value (i.e., "00", "01", "10", "11"). The random 2-bits will then be the corresponding 2-bit value generated based on the determination of which value range the sample falls into. In general, in order to generate, from one sample, a random set of N-bits, the sample may be categorized to fall into one of $2^N$ value ranges.

In some example embodiments, the random bit(s) generated may not be binary bits (e.g., may have more than two bit levels), and there may be more than $2^N$ value ranges for a set of random N-bits. In some example embodiments, the value ranges may be defined such that there is equal probability of a sample value falling into any one of the value ranges. In some example embodiments, for example where the random bits are desired to be weighted towards certain values or where absolute randomness is not desired, the value ranges may have unequal probability of a sample value falling into any one of the value ranges.

Although the output random signal has been described as being sampled (e.g., for producing a random digital signal), in some example embodiments sampling is not done and instead an analog random signal may be generated based on the output random signal. Although categorization of the signal into a value range has been described as being carried out on a sample, in some example embodiments, such categorization may be carried out on the analog signal (e.g., using hardware components) prior to or in the absence of sampling.

In some example embodiments, the output random signal from the mixer 120 may be directly used (i.e., without use of the photo detector 150). In some example embodiments, a detector, such as the photo detector 150, may be used to convert the optical output random signal into an electrical random signal.

A more rigorous approach may be used to describe the generation of the digital random signal, for example as explained below.

The net contribution of a large number of SE photons may be characterized by a random walk process, and the phase fluctuation $\Delta\theta(t, T_d)$ may be treated as Gaussian white noise with a variance of [28]:

$$\langle [\Delta\theta(t, T_d)]^2 \rangle = \frac{2T_d}{\tau_c} \quad (5)$$

Here $\tau_c$ is the coherence time of the laser 110, which may be related to its linewidth $\Delta f$ as $$\tau_c \cong \frac{1}{\pi \Delta f}. \quad [28]$$

Equation (5) shows that as long as $T_d \gg \tau_c$, the resulting Gaussian distribution may be treated as a uniform distribution in the range of $[-\pi, \pi)$ in practice.

It may be useful to define two other time constants here. The response time of the photo detector $T_R$ may be defined as the reciprocal of the detector's bandwidth. The sampling period $T_S$ may be defined as the reciprocal of the sampling rate.

A condition for random signal generation without phase stabilization may be summarized as $$T_d \gg \tau_c; T_S - T_d \gg T_R \quad (6)$$

Equation (6) illustrates that the maximum sampling rate (or the random digital signal generation rate) may be determined by the coherence time of the laser 110. In some example embodiments, the coherence time of the laser 110 may be pre-set, for example, to a few ns. To generate a relatively high quality random digital signal, the sample period $T_S$ may be chosen to be longer than the coherence time (e.g., larger than 10 ns, which corresponds to a maximum sample rate of 100 MHz). In some example embodiments, for example where a lower quality random signal is desired, it may not be necessary to set the sample period $T_S$ to be longer than the coherence time. For example, such a lower quality random signal may be improved using a cryptographic hash table and/or conventional randomness extractor techniques.

Figure 2A:
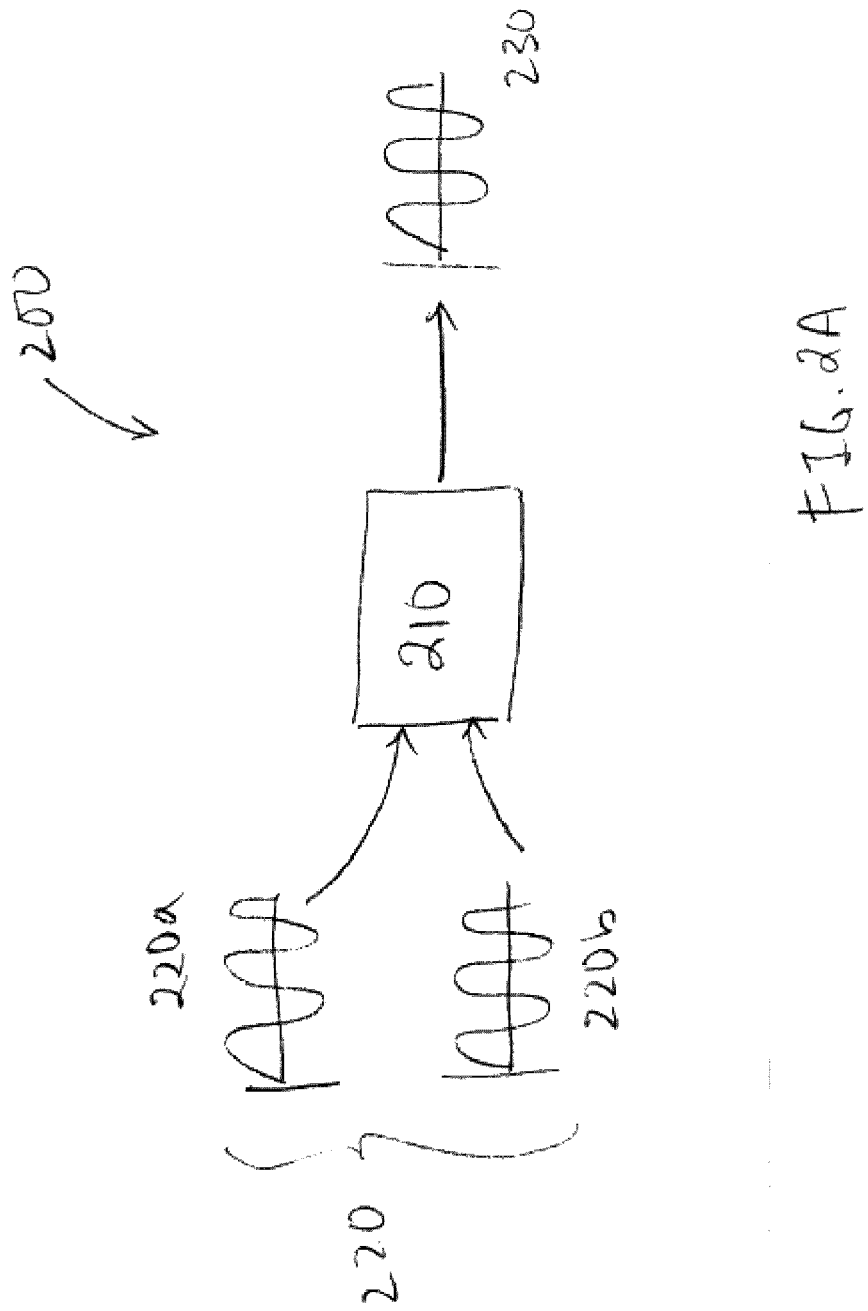
FIG. 2A shows another example embodiment of a system for generating a random signal.

Another example system 200 for generation of a random signal is now described with reference to FIG. 2. The system 200 may be based on the example system 100 described above. The system may include a mixer 210 (e.g., using an interferometer, a difference circuit, etc.) for receiving at least two input signals 220a, 220b (generally referred to as 220). Each of the input signals 220 may have quantum noise in its respective phase. The mixer 210 may generate an output random signal 230 having a random variation in its intensity that is derived from the quantum phase noise of the input signals 220. In some example embodiments, the output signal 230 may be generated through conventional signal mixing or coupling methods including, for example, interference operations (including, for example, superimposing the input signals 220 or differencing the input signals 220), thus extracting the quantum phase noise of the input signals 220.

The output random signal 230 may also be referred to as a heterodyne signal (i.e., an interference signal produced from two different input signals 220). Where the input signals 220 are derived from the same source signal (e.g., where one input signal 220 is a time delayed version of the other) the output random signal 230 may be referred to as a self-heterodyne signal.

In some example embodiments, the input signals 220 may be electromagnetic waves, such as optical signals (e.g., produced by a light source such as a laser or a broadband source), each having quantum noise in its respective phase.

Figure 2B:
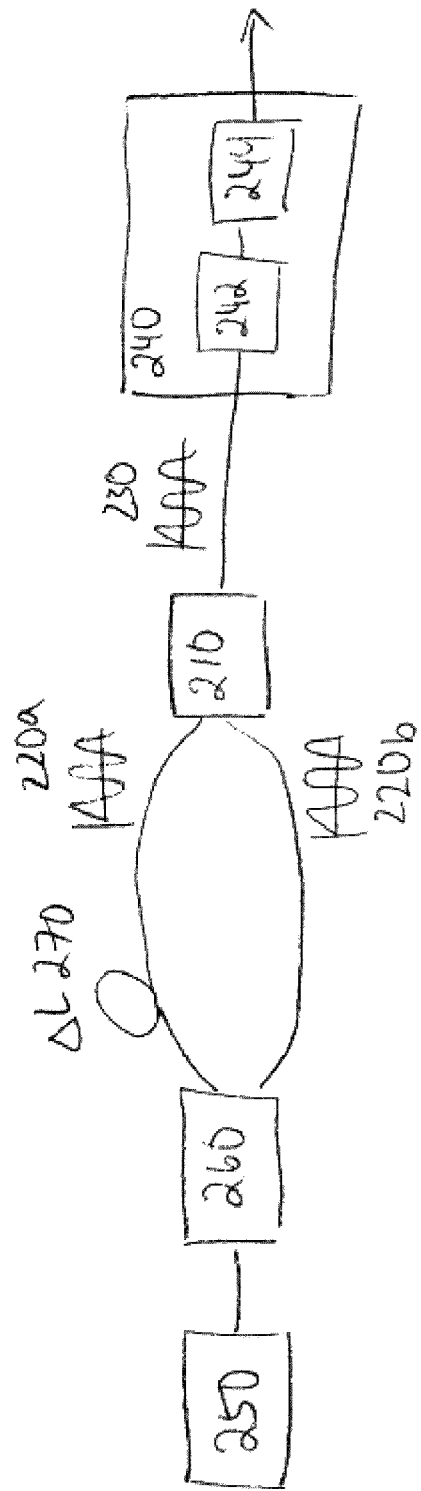
FIG. 2B shows another example embodiment of a system for generating a random signal.

In some example embodiments, the example system 200 may include additional components, for example as shown in FIG. 2B.

In FIG. 2B, the example system 200 may also include a detector 240 that receives the output random signal 230 and further processes the output random signal 230 (e.g., to generate a random digital signal). The quantum noise in the phase of the input signals 220 may result in a random variation in the intensity of the output random signal 230. In some example embodiments, the output random signal 230 may have quantum noise in its intensity, however this value may be too small to be useable (e.g., too small to be detectable by conventional components and/or too small compared to other non-quantum-derived noise). In some example embodiments, it may be the variation in the intensity of the output random signal 230 that is useful. In some example embodiments, a system may use sufficiently sensitive equipment and/or be sufficiently isolated from other non-quantum-derived noise sources, such that quantum noise in the intensity of the output signal 230 may be used directly.

The detector 240 may detect this random variation in the intensity value of the output random signal 230 and generate a further random signal based on this. For example, for a binary random signal, the detector 240 may compare the output random signal 230 against a threshold, and generate a high value when the output signal 230 is above the threshold and a low value when the output signal 230 is below the threshold. The threshold value may be defined to ensure that there is equal probability that the output random signal 230 will be on either side of the threshold, or the threshold value may be defined to bias the probability weighting of the resultant binary signal.

In some example embodiments, the detector 240 may include one or more comparators (not shown). The comparator(s) may compare the received output random signal 230 against a threshold value and produce a further random signal based on this comparison. The use of a signal comparator in this manner may produce a binary random signal, whereas the use of two or more comparators in this manner may produce a random signal having more bit-levels. Where the comparator(s) is an analog component, the random signal generated may be an analog random signal.

In some example embodiments, the detector may include a sampler 242, for generating digital random signals. The sampler 242 may sample the output random signal 230 to obtain a sample having a value (e.g., intensity value) representing the sampled intensity of the output random signal 230. The sample value may be provided to a processor 244 that is configured (e.g., the processor 244 may execute computer-readable instructions to cause the processor 244 to carry out) to generate a random bit signal based on the sample. For example, the processor 244 may be configured to compare the sample against a threshold value and generate a binary random signal, as described above.

In some example embodiments, the sampler 242 may be used without the processor 244, for example to sample the output of analog comparators, to convert the analog random signal into a digital random signal.

In some examples, the system 200 may include a signal source 250, such as a laser, which may be a single mode semiconductor laser (which may be a distributed feedback (DFB) laser), although other signal sources may also be suitable. In some example embodiments, the sampler 242 may sample the output random signal 230 at a time interval greater than the coherence time of the signal source 250, in order to obtain a high quality random signal. In other example embodiments, such as those described further below having phase shift reduction, this condition may not be necessary.

In the example embodiment of FIG. 2B, the system may include a splitter 260 for splitting the signal from the signal source 250 into two input signals 220 for input to the mixer 230. Thus, each of the input signals 220 may have quantum phase noise from the signal source 250. In this example, one of the two input signals 220 is time delayed relative to the other, for example due to a path difference caused by a fiber loop 270. The fiber loop 270 may be designed to have a length sufficient to cause a relative time delay between the input signals 220 that is greater than the coherence time of the signal source 250, where the signal source 250 is a laser. In some examples, a time delay between the input signals 220 may be introduced by other conventional methods.

In other example embodiments, instead of using a splitter 260 the input signals 220 may come from individual signal sources (not shown), which may be the same or different. The signal source(s) may be, for example, electromagnetic sources, such as optical sources or other suitable sources. Optical signal sources may be, for example, a laser, a broadband light source with a narrow passband, or other suitable optical sources.

Although not shown, the example system 200 may include additional components for improving signal behaviour. For example, the example system 200 may include one or more polarization controllers for maintaining and/or controlling the polarization of the input signals 220.

Example System with Phase Shift Reduction

Another example embodiment is now described with reference to the example system 300 of FIG. 3. In this example, the system may be similar to that of FIG. 1, FIG. 2A or FIG. 2B, with the modification that the effects of phase drift may be reduced, for example using phase stabilization, for example using a phase modulator 310 and a second photo detector 320 (which, in some example embodiments, may be collectively referred to as a phase stabilizer and/or may be provided as a single component). Although the phase stabilization, in this example embodiment, is shown as being provided by more than one component, in some examples, the phase stabilization may be provided by a single component. Where phase stabilization is provided by than one component, such components may be separately located within the system 300, for example interspersed with other components.

In this example embodiment, phase stabilization may provide for reducing or minimizing the effects of phase drift of one or more signals (e.g., due to environmental disturbances, such as electromagnetic noise, vibrations, ambient temperature fluctuations, etc.). This may be useful to overcome the above-described limitation to the sampling time, which may be imposed by the coherence time of a laser source. This can be seen from equation (4). By stabilizing the phase (e.g., at the mixer), the effects of phase drift may be reduced or eliminated, and the term $\omega_0 T_d$ in the cosine function may be treated as a constant. In this manner, it may be possible to generate a relatively high quality random signal where the sampling time interval $T_S$ is smaller than or much smaller than the coherence time $\tau_C$ of the input signal.

Phase stabilization may involve maintaining the phase difference between the input signals 220 to a constant or near constant value. For example, phase stabilization may be set such that $\omega_0 T_d = 2m\pi + \pi/2$ (where m is an integral), which may correspond to the linear region of the sinusoidal signal, and equation (4) may be further simplified as $$S(t) \propto \sin[\Delta\theta(t, T_d)] \qquad (7)$$

In some example embodiments, the phase difference between the input signals may be stabilized at another constant or near constant value, which may correspond to non-linear regions of the sinusoidal signal, for example.

In some example embodiments, phase stabilization may include feedback control, such as shown in FIG. 3 with the output signal 230 from the mixer 210 being split and fed as input into both detector 240 and detector 320. The signal from detector 320 may be used as feedback to control the phase modulator 310 on at least one input to the mixer 210. Any noise and/or error from the phase feedback control, which may contribute to additional classical noise, may be negligible (e.g., where low noise and/or high precision components are used). In some example embodiments, phase stabilization may include reducing or removing sources of environmental disturbances including, for example, reducing or eliminating temperature fluctuations (e.g., controlling ambient temperatures to maintain a substantially constant temperature within about 0.01 to about 0.1 degrees Celsius), vibrations (e.g., insulating the system from mechanical disturbances), and sources of electromagnetic noise (e.g., by providing the system with appropriate shielding), among others.

From equation (7), the discrete time series samples of S(t), which is labelled as $\tilde{S}(t_i)$, may have a symmetric distribution around zero. As described above, a further random signal may be generated, for example by categorizing the samples into one of two or more value ranges. For example, by taking the sign of $\tilde{S}(t_i)$ (i.e., positive or negative), a binary random signal may be generated. Because of phase stabilization, it may not be necessary to assume that $\Delta\theta(t, T_d)$ is uniformly distributed in the range of $[-\pi, \pi)$. Thus, for generating a digital random signal, the sampling rate (and hence random number generation rate) may not be limited by the coherence time (or linewidth) of the laser. In some example embodiments, the sample rate may be mainly limited by the bandwidth of the detection system.

In some example embodiments, methods other than phase stabilization may be used to reduce or remove the effects of phase drift, for example using additional components, using signal processing methods and/or post-processing of the output signal 230. For example, the output random signal 230 may be filtered (e.g., using a high pass filter) to remove or reduce the low frequency effects of phase drift. In another example embodiment, the low frequency component of the output random signal 230 may be measured (e.g., using a low pass filter) and subtracted from the output random signal 230. This may avoid the introduction of classical noise from the feedback-based phase stabilization described above. Where phase drift reduction is carried out using signal processing (i.e., using software instead of hardware components), for example using digital signal processing (e.g., using the processor 244) for filtering, the number of components required may also be minimized, which may help to decrease the cost and/or increase the robustness of the example system 300.

Figure 4:
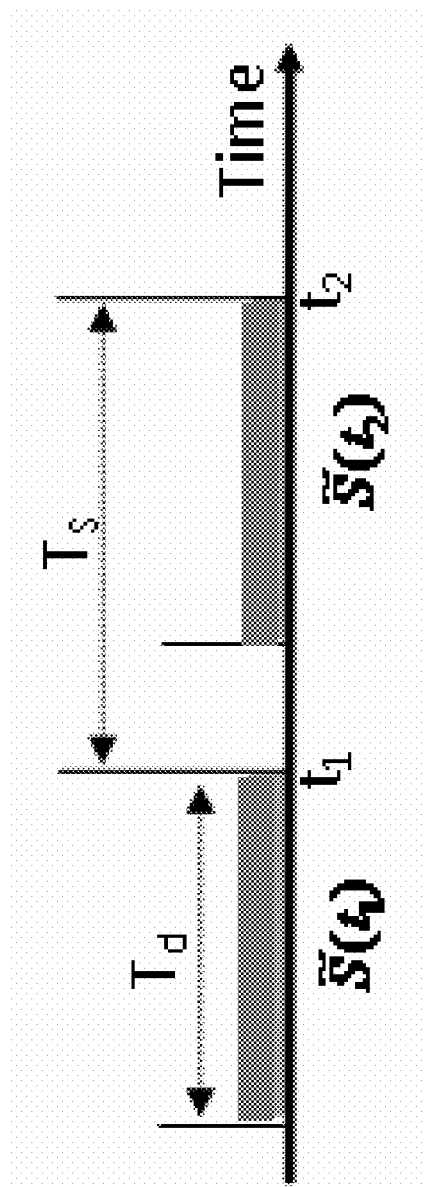
FIG. 4 illustrates an example parameter for an example system for generating a random signal.

To minimize or reduce any correlation between adjacent samples, the time delay imbalance $T_d$ may be selected to be smaller than the sampling period $T_S$. An example is illustrated in FIG. 4.

For example, suppose that the first sampling result $\tilde{S}(t_1)$ is determined by phase noise from the SE photons emitted in the time period of $(t_1-T_d, t_1)$, while the second sampling result $\tilde{S}(t_2)$ is determined by phase noise from the SE photons emitted in the time period of $(t_2-T_d, t_2)$. By choosing $T_S=t_2-t_1>T_d$, $\tilde{S}(t_1)$ and $\tilde{S}(t_2)$ may be contributed by SE photons emitted at different (i.e., non-overlapping) time windows, thus there may be no correlation between them. In some example embodiments, this consideration may not be necessary, for example where absolute randomness is not required or desired.

There may be other factors to be considered based on the coherence time. For example, it may be desirable for the coherence time $\tau_c$ to be larger than the response time $T_R$ of the detector 240 and/or detector 320, in order to avoid the output signal 230 being averaged out due to its random fluctuation within the time period for acquiring one sample. On the other hand, from (5), it may be undesirable for $\tau_c$ to be too large, in order to avoid the variance of phase noise $\Delta\theta(t, T_d)$ being too small to be resolved using conventional components.

Generally, for random number generation with phase shift reduction, it may be desirable for:

$$T_S - T_d > T_R \quad (8)$$

Where the system does not include a signal source, or where the signal source is other than a laser, the above constraints may not apply, or different constraints may apply.

In practical example of the example system 300 of FIG. 3, the signal source 250 may be a laser, such as a 1.5 μm single mode cw DFB diode laser (ILX Lightwave), to provide the source of quantum phase noise. Based on equation (1), the linewidth of the laser diode may be expected to vary linearly with reciprocal laser output power, which may be controlled, for example, by adjusting the driving current. By operating the laser diode at a power level where its linewidth is much larger than the linewidth at the high power limit, the majority of the phase noise may be attributed to quantum noise.

In this example, the heterodyne output signal 230 may generated through delayed self-heterodyning (e.g., using a single signal source 250 and splitting the signal as described above). A mixer 210 (e.g., using a fiber coupler) may be used to interfere the input signals 220, and a fiber loop 270 may introduce a length imbalance of $\Delta L$, adding a time delay between the input signals 220. The system 300 may include a splitter 260 (e.g., using another fiber coupler), and the two resultant signals may be used, with a time difference between the two due to the length imbalance, as input to generate the heterodyne output random signal 230 at the mixer 210. The mixer 210 may also split the output signal 230 into two and provide this to two detection channels: the first detector (PD$_1$) 240 may include a sampler 242 (e.g., a suitably fast sampler for a high rate of random signal generation, such as a 5 GHz bandwidth InGaAs photodetector and a 3 GHz bandwidth real time oscilloscope) and may additionally include a processor 244, to generate a random digital signal; the second channel (PD$_2$) 320 may be used for phase stabilization, including a monitoring component (e.g., having a relatively low bandwidth of 1 MHz) to monitor the relatively slow phase drift of the heterodyne output random signal 230 (e.g., due to ambient fluctuations or other sources of phase drift).

Due to its relatively low bandwidth, PD$_2$ 320 may only monitor the relatively slow phase drift of the heterodyne output 230 signal, while the relatively high frequency phase fluctuation due to SE may not be monitored. The output from PD$_2$ (which may be sampled by a process, such as a computer together with a DAQ card (NI PCI6115)) 320 may be provided as a feedback control signal (e.g., to a phase modulator 310 modulating the phase of an input signal 220b) for maintaining the phase difference between the input signals 220 at a constant or near constant value. In some examples, more than one phase modulator may be used, for example where the phases of both input signals are modulated.

In this example embodiment, one or more polarization controllers may be used, for example as shown in FIG. 3. For example, a first polarization controller 330 may be used to help ensure that the polarization state of the input light is aligned with the axis of the phase modulator, while a second polarization controller 340 may be employed to help achieve high interference visibility. In some example embodiments, polarization controllers may not be used, for example where the fibers are polarization maintaining fibers, or where polarization of the signals is not a concern.

As discussed above, by reducing the effects of phase shift (e.g., using phase stabilization or by filtering out low frequency phase shift effects), the sampling rate (and hence random number generation rate) may not be limited by the coherence time of the laser (i.e., it may be possible to have $T_S \ll \tau_C$), so a very high random number generation rate may be achieved.

In this example, the driving current of the laser may be set to I=12 mA. In some examples, if the driving current is too small, the laser power may be too weak and the output signal 230 may be dominated by the noise of the detection system rather than the quantum phase noise of the input signals 220; on the other hand, if the driving current is too large, the quantum phase fluctuation may be too small to be detected or measured (e.g., using conventional components). By using the technique described in [24], the coherence time $\tau_c$ of the laser in this example was determined to be about 10 ns (or a linewidth of 30 MHz) under the condition of I=12 mA and 320 ns (or a linewidth of 1 MHz) at a high driving current (I=50 mA). From (5), for a fixed $T_d$, the phase noise variance may be proportional to $1/\tau_c$. Thus the phase noise variance at I=12 mA may be about 32 times larger than that at I=50 mA. The phase noise variance at the high power limit (or the high driving current) may be attributed to classical noise and it may be assumed that it is laser power independent. At the lower power, the phase noise of the laser may be dominated by quantum noise.

In other example embodiments, other signal sources, such as other types of lasers or other optical or non-optical sources, may be used, which may give rise to different phase noise characteristics. One or more signal sources or input signals may be selected for the example system, depending on the desired application and/or desired random signal generated, for example.

In order to evaluate the performance of an example system, it may be noted that for a theoretical ideal RNG, there may be no correlation between its outputs at different times. That is, from the correlation theorem in Fourier transformation, the spectrum of an ideal RNG may be expected to be flat [29].

Figure 5:
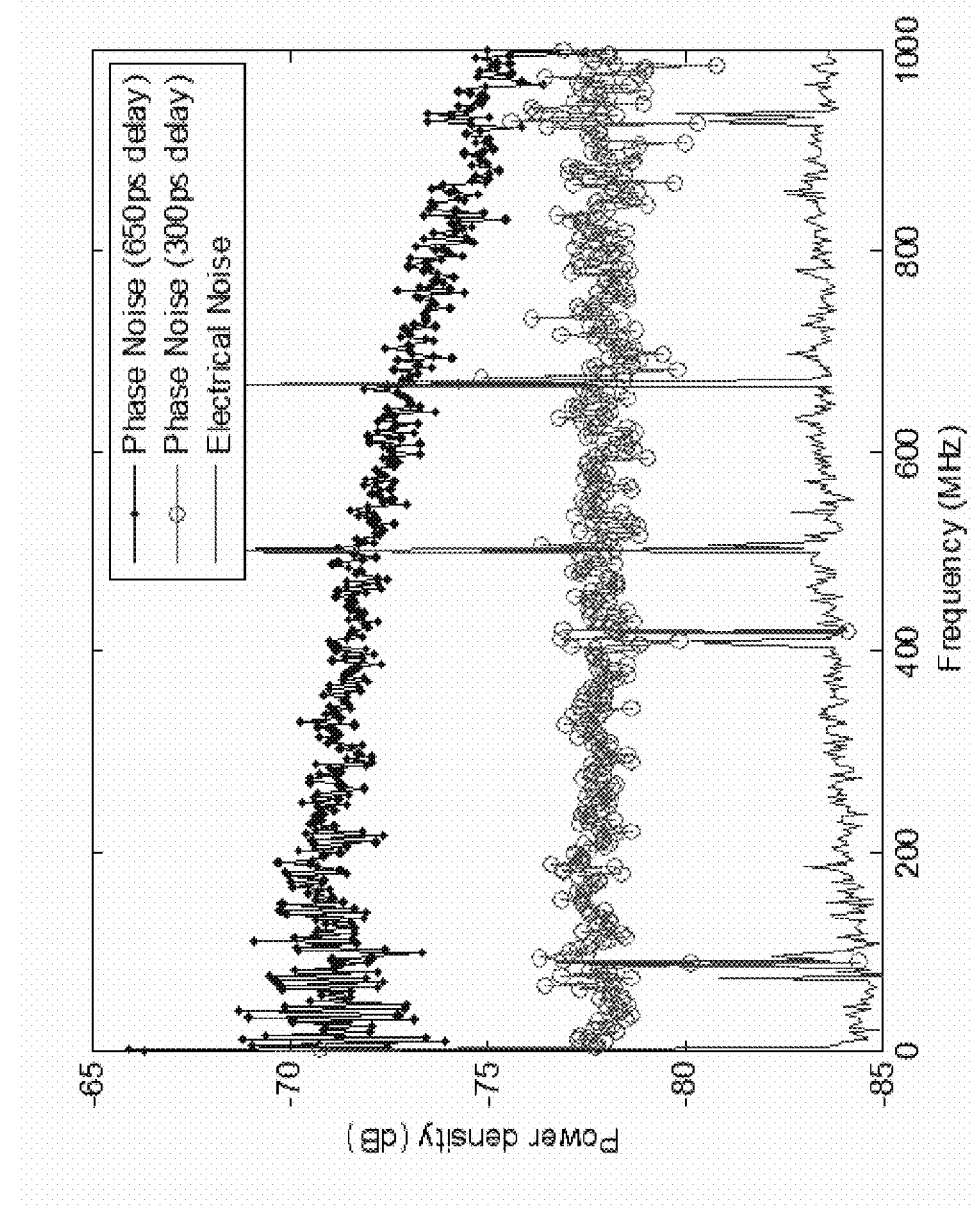
FIG. 5 is a chart illustrating example noise spectra for an example system for generating a random signal.

Reference is now made to FIG. 5. The noise spectrum of the output random signal generated by example system was measured. In this example embodiment, a spectrum analyzer (HP8564E) may be used to sample the output random signal. Example measurements were taken using two example time delay imbalances: $Td_1=650\pm100$ ps and $Td_2=250\pm100$ ps. Examples of the measurement results are shown in FIG. 5. The electrical noise of the detection system may be measured by blocking the laser output.

Referring still to FIG. 5, several features may be noted. The electrical noise, which may look random in time domain, in this example measurement presents a few dominant spectral lines. These spikes may be due to environmental electromagnetic noises or other environmental disturbances. Such noises may be removed, for example, through effective shielding, use of less susceptible components or other such methods. In some example embodiments, the system may include shielding to exclude or reduce the effects of any such environmental electromagnetic noise. In this example embodiment, the spectra of phase noise are broadband. In this example embodiment, the noise spectrum measured with a $T_d$ of $650\pm100$ ps may have a substantially clear low-pass character, while the noise spectrum measured with a smaller $T_d$ of $250\pm100$ ps may shows a substantially flatter frequency response.

As described above, the measured phase noise may be contributed by the SE photons emitted in a time interval of $T_d$. This may introduce an equivalent integration time in the order of $T_d$ and thus may reduce the bandwidth of the whole system to $1/T_d$. In this example embodiment, at low frequency region, the noise power measured at $T_d=250\pm100$ ps is about 7 dB lower than that at $T_d=650\pm100$ ps. This may be consistent with equation (5), which may suggest a substantially linear relation between phase variance and the time delay $T_d$.

In this example embodiment, to generate a random digital signal, $T_d$ may be set to be $650\pm100$ ps and the output of $PD_1$ may be sampled, for example by a 3 GHz oscilloscope at a sampling rate of 1 G samples per second (corresponding to $T_S=1$ ns).

In some example embodiments, the system may be configured to generate a random signal having a noise spectrum with certain desired characteristic(s), such as certain desired frequency and/or power characteristics. For example, different values of $T_d$ and/or $T_S$ may be selected, or the input signal(s) and/or signal source(s) may be selected to have certain phase noise characteristic(s).

In some example embodiments, the output random signal may be processed on-line or in real-time, for real-time generation of a random digital signal. In some example embodiments, the output random signal may be processed using analog components (e.g., an analog detector, such as an analog comparator) to generate a real-time random signal.

In other example embodiments, the output random signal may be saved, for example in one or more memories in the system (e.g., the hard drive of the oscilloscope) in samples. For example, the detector (such as an oscilloscope) may continuously sample a 1 Mb frame of data, may transfer the data into the memory (e.g., a hard drive) and then may start to sample another frame of data. Other methods and/or components for storing and/or sampling the output random signal may also be used. For example, the system may include one or more memories (e.g., RAM, ROM, flash memory, etc.) in a processor, or as an individual component. The system may also communicate with one or more memories external to the system for storing such data.

A mean signal value $S_0$ may be calculated (for example based on all the samples within a single frame or using a running average), or $S_0$ may be pre-set (e.g., based on known characteristics of the system). To generate a binary random signal from the sampling results $\tilde{S}(t_i)$, the samples may be compared to the mean value $S_0$: the i-th bit may be assigned as either "1" if $\tilde{S}(t_i)>S_0$ or "0" if $\tilde{S}(t_i)<S_0$. In other examples, the sample values may be categorized into two or more value ranges, in order to generate a random signal having higher bit levels, such as using the methods described above.

The random signal generated by the example system may be transmitted for further processing (e.g., to be used to generate a quantum random key, such as for encryption purposes) and/or may be stored (e.g., onto a memory in the system or in an external memory) for later use and/or further processing.

In some examples, the generated random signal may be further processed, which may further improve the randomness of the signal. For example, in the example embodiment described above, two random signals (e.g., two 100 Mbits binary random number trains) may be generated, which may be referred to as Bin1 and Bin2. By performing a bitwise XOR operation between Bin1 and Bin2, the randomness may be further improved. This XOR operation may be commonly used on improving randomness of a RNG [6, 30]. The random number train generated through this XOR process may be referred to as Bin3. Since Bin1 and Bin2 have been generated at 1 Gbit/s, the equivalent generation rate of Bin3 is 500 Mbit/s. Bin3 may have better randomness than either of Bin1 and Bin 2. Other such techniques for improving the randomness of a signal may be used, which may also involve combining two or more generated random signals. In some examples, one or more memories, which may be part of the system or external to the system, may be used to store one or more generated random signals, for the purpose of such processing.

Figure 6:
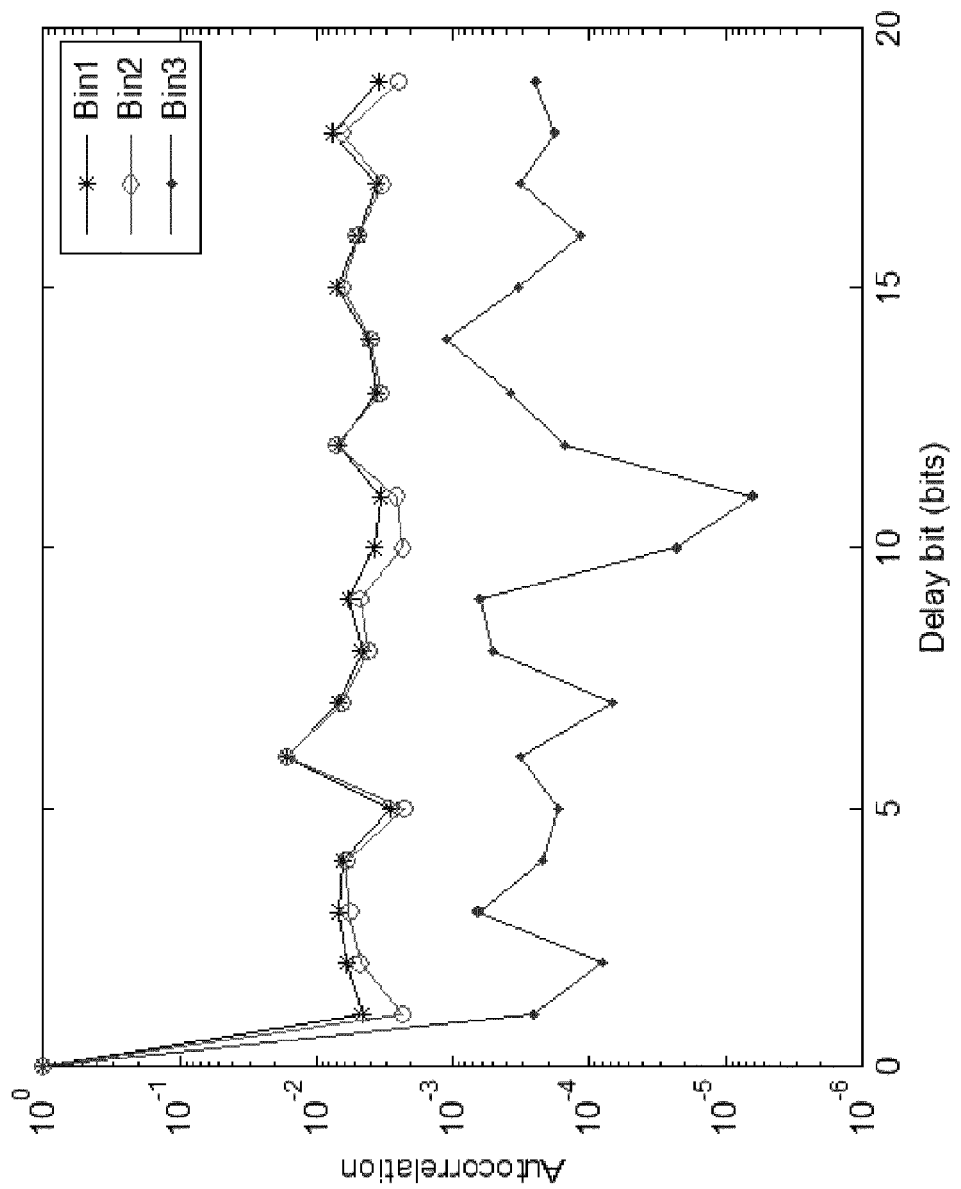
FIG. 6 is a chart illustrating example autocorrelation values for an example system for generating a random signal.

To evaluate the qualities of these example random signals, the autocorrelation of each random bit train may be calculated. The example results are shown in FIG. 6. From FIG. 6, it may be seen that the residual correlation of Bin3 is lower than that of Bin1.

The randomness of Bin3 may be further evaluated with the DIEHARD test suite [31]. As shown in FIG. 7, Bin3 passed all the tests, suggesting that a random signal produced by combining two or more random signals generated using the example system may be sufficiently random.

Other Variations

In some example embodiments, the systems and methods disclosed herein may be achieved using conventional off-the-shelf components. Speeds of such conventional components (e.g., the oscilloscope (3 GHz bandwidth) and the photo detector (5 GHz bandwidth)) may limit the rate of random number generation. In some embodiments, using specialized or customized components may improve the speed of random number generation and/or other performance characteristics (e.g., frequency and/or power of the noise spectrum in the generated random signal).

In some example embodiments, the sensitivity of the detection system may be improved by, for example, replacing the photo detector with a balanced detector followed by an electrical subtraction circuit. In some example embodiments, the real time oscilloscope may be replaced by, for example, a high speed comparator or a high speed analogue to digital convertor. In some examples, the signal source may be a narrowband source (e.g., a laser or a local oscillator) or may be a broadband source (e.g., an incandescent light or a light-emitting diode) together with a narrowband optical filter. Where a narrowband filter is used, the coherence time (or linewidth) may be determined by the bandwidth of the filter. Other such improvements by using different components may be possible.

In some example embodiments, the generated random signal may be further processed, for example to improve the randomness of the signal. For example, two separately generated random signals may be processed using a hash function, and/or a randomness extractor (e.g., a bit-wise XOR operation or any other suitable conventional operation for improving randomness) to produce a third random signal. Generally, a suitable randomness extractor may be any algorithm or process designed to generate nearly perfect random numbers from the output of a high entropy source.

In some example embodiments, the mixer may produce two or more output random signals, which may be the same or may be different, for example where one output signal is used for feedback control, or where different output random signals are desired for different purposes.

In some example embodiments, where inputs to the mixer are derived from the same source signal with a relative time delay, the sampling period $T_S$ may be selected to be much larger than the time delay and/or the response or coherence time of the system $T_R$ or $\tau_c$, to avoid any correlation between consecutive samples. This may limit the speed of random number generation. In some example embodiments, it may be more efficient to tolerate a finite correlation at the sampling stage use a randomness extractor (e.g., a XOR operation) to remove any residual correlation.

Comparing with the random number generation scheme based on measuring vacuum noise [20], the disclosed systems and methods may be realized by interfering two relatively strong laser beams. The photo-detector does not have to be shot noise limited, which may simplify implementation.

In the random number generator reported in [14], for a laser operated under normal conditions, it may be very difficult to resolve the small amplitude fluctuation due to SE. In [14], the authors operated the lasers under chaotic conditions by introducing strong external feedbacks. The observed noise may be mainly due to the chaotic behavior of the lasers rather than the quantum noise from SE.

In some example embodiments, the system may be provided in an integral package, for example as a single integrated circuit (IC) component, or in a portable and/or secure enclosure.

The disclosed systems and methods may be suitable for generating a random key, for example, for cryptography purposes and/or for secure communication or exchange purposes (e.g., on-line communication, on-line gaming, on-line banking, etc.). For example, the disclosed systems and methods may be used in quantum key distribution (QKD). In the special case of QKD, the randomness extractor may be integrated into the privacy amplification process. In QKD, after the quantum transmission stage, the two users may perform error correction and privacy amplification (e.g., to correct errors and remove the eavesdropper's information) on the raw key to generate the final secure key. Since the data size of the raw key may be much less than that of the random numbers used in the QKD experiment, it may be efficient to treat any imperfections of the QRNG as partial information leaked to the eavesdropper, which may be removed during privacy amplification. The disclosed systems and methods may also be suitable for generating random numbers suitable, for example, for statistical analyses or computer simulation purposes, among others.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. Although example embodiments have been discussed and shown with individual components, it should be understood that the order of the components may be varied, that one or more components may be omitted or replaced, and that one or more components may be added. Also, it should be understood that two or more components as described in the example embodiments may be integrated into a single component, for example a single printed lightwave circuit (PLC) may be used in place of the splitter, the mixer and/or the fiber length difference, among others. All values and sub-ranges within disclosed ranges are also disclosed. The subject matter described herein intends to cover and embrace all suitable changes in technology. All references mentioned are hereby incorporated by reference in their entirety.

REFERENCES

[1] N. Metropolis and S. Ulam, *J. Am. Stat. Assoc.* 44, 335 (1949).

[2] B. Schneier, *Applied Cryptography* (Wiley, New York, 1996).

[3] C. H. Bennett, G. Brassard, Proceedings of *IEEE International Conference on Computers, Systems, and Signal Processing*, (IEEE, 1984), pp. 175-179.

[4] V. Jacques, E. Wu, F. Grosshans, F. Treussart, P. Grangier, A. Aspect, and J.-F. Roch, *Science* 315, 966 (2007).

[5] The testing of Bell inequalities also requires random numbers. Hidden correlations between the supposedly local random numbers can lead to a loophole in the testing of Bell inequalities. In fact, people have proposed generating the random numbers for testing Bell inequalities by observing lights from distant stars in different sectors of the sky. However, the inflation theory shows that even different sectors of the sky might previously been in causal contacts with each other and, therefore, their star lights might still have hidden correlations.

[6] B. Barak, R. Shaltiel, and E. Tromer, in *Cryptographic Hardware and Embedded Systems-CHES* 2003, edited by C. D. Walter, K. Ko, and C. Paar (Springer-Verlag, Berlin, 2003), pp. 166180.

[7] I. Goldberg and D. Wagner, *Dr. Dobb's Journal*, pp. 66-70 (1996).
[8] von Neumann, "Various techniques used in connection with random digits", *Monte Carlo Method, National Bureau of Standards Applied Mathematics Series* 12, edited by A. S. Householder, G. E. Forsythe, and H. H. Germond (Washington, D.C.: U.S. Government Printing Office, 1951), pp. 36-38.
[9] W. T. Holman, J. A. Connelly, and A. Dowlatabadi, *IEEE Trans. Circuits Syst. I* 44, 521 (1997); C. S. Petrie and J. A. Connelly, *IEEE Trans. Circuits Syst. I* 47, 615 (2000).
[10] Walker, published on the internet:
http://www.fourmilab.ch/hotbits/hardware3.html
[11] D. Davis, R. Ihaka, P. R. Fenstermacher, in *Advances in Cryptology—CRYPTO '94 Conference Proceedings*, edited by Yvo G. Desmedt, *Lecture Notes in Computer Science* 839, (Heidelberg: Springer-Verlag, 1994), pp. 114-120.
[12] http://www.intel.com/design/software/drivers/platform/security.htm.
[13] T. Jennewein, U. Achleitner, G. Weihs, H. Weinfurter, and A. Zeilinger, *Rev. Sci. Instrum.* 71, 1675 (2000).
[14] A. Uchida, et al., *Nature Photonics* 2, 728 (2008); I. Reidler, Y. Aviad, M. Rosenbluh, and I. Kanter, *Phys. Rev. Lett.* 103 024102 (2009).
[15] F. Dynes, Z. L. Yuan, A. W. Sharpe, and A. J. Shields, *Appl. Phys. Lett.* 93, 031109 (2008).
[16] http://www.idquantique.com.
[17] H. Takesue, et al., *Nature Photonics* 1, 343 (2007).
[18] Z. L. Yuan, et al., *Appl. Phys. Lett.* 92, 201104 (2008).
[19] http://optoelectronics.perkinelmer.com.
[20] A. Trifonov and H. Vig, U.S. Pat. No. 7,284,024 (2007).
[21] B. Qi, Y.-M. Chi, H.-K. Lo, L. Qian, Proceedings of *The 9th Asian Conference on Quantum Information Science*, (Nanjing, China, August, 2009), pp. 64-65.
[22] C. H. Henry, *IEEE J. Quantum Electron.* QE-18, 259 (1982).
[23] M. W. Fleming and A. Mooradian, *Appl. Phys. Lett.* 38, 511 (1981).
[24] Y. Yamamoto, T. Mukai, S. Saito, *Electron. Lett.* 17, 327 (1981).
[25] R. W. Tkach and A. R. Chraplyvy, *J. Lightwave Technol.* LT-4, 1711 (1986).
[26] K. Vahala, A. Yariv, *Appl. Phys. Lett.* 43, 140 (1983).
[27] K. Kikuchi and T. Okoshi, *Electron. Lett.* 19, 812 (1983).
[28] A. Yariv and P. Yeh, *Photonics: optical electronics in modern communications* (*sixth edition*). Oxford University Press (2007).
[29] E. Oran Brigham, *The fast fourier transform and its applications*. Prentice-Hall (1998).
[30] M. Epstein, L. Hars, R. Krasinski, M. Rosner and H. Zheng, "Design and Implementation of a True Random Number Generator Based on Digital Circuit Artifacts", *Lecture Notes in Computer Science*. 2779 152 Springer-Verlag Berlin Heidelberg (2003).
[31] http://www.stat.fsu.edu/pub/diehard/.
[32] M. Fiorentino, C. Santori, S. M. Spillane, and R. G. Beausoleil, *Phys. Rev. A* 75 032334 (2007).
[33] H. Guo, W. Tang, Y. Liu, and W. Wei, arXiv: 0908.2893v2.

The invention claimed is:

1. A system for generation of a random signal, the system comprising:
at least one source supplying at least two input signals to corresponding signal paths, each of the at least two input signals exhibiting phase variations induced by quantum noise present in the at least one source;
a mixer for receiving and interfering the at least two input signals to generate at least one output signal;
wherein the output signal exhibits random intensity variation that is a function of the quantum noise induced phase variations exhibited by the at least two input signals.

2. The system of claim 1 further comprising a detector for receiving the output signal and generating a further random signal from the random intensity variation of the output signal.

3. The system of claim 2 wherein the detector comprises at least one comparator for comparing the output signal against a threshold value and generating the further random signal based on the comparison.

4. The system of claim 2 wherein the detector comprises a sampler for sampling the output signal to obtain a plurality of samples, each of the plurality of samples having a respective value dependent on the random intensity variation of the output signal, the system further comprising a processor configured to execute computer-readable instructions to cause the processor to generate a random digital signal based on the plurality of samples.

5. The system of claim 4 wherein the instructions further cause the processor to:
for each of the plurality of samples, determine which of a plurality of value ranges a value of the corresponding sample falls within, wherein the probability of a given sample value falling within a given value range is equal for all of the value ranges; and
generate the random digital signal based on the plurality of determinations.

6. The system of claim 5 wherein the plurality of value ranges comprise a first range defined above a threshold value, and a second range defined below the threshold value, and wherein the generated random digital signal from one the plurality of samples is a comprises a sequence of single bits.

7. The system of claim 6 wherein the random digital signal generated from one the plurality of samples comprises a sequence of groupings of N bits each and there are $2^N$ value ranges.

8. The system of claim 6 wherein the instructions further cause the processor to apply a cryptographic hash function to the random digital signal.

9. The system of claim 4 wherein the instructions further cause the processor to process at least two separately generated random digital signals to generate a third random digital signal.

10. The system of claim 1 further comprising a phase stabilizer for reducing effects of phase drift of at least one of the input signals, the phase drift being due to one or more environmental disturbances.

11. The system of claim 10 further comprising a sampler for generating a random digital signal sampling the output signal, and wherein reducing the effects of phase drift enables the sampler to employ a sampling time interval that is smaller than a coherence time of at least one of the input signals.

12. The system of claim 11 wherein the phase stabilizer is configured to monitor phase of the output signal and modulate the phase of at least one input signal based on the monitored phase of the output signal.

13. The system of claim 10 wherein the phase stabilizer is configured to maintain substantially constant phase difference between the at least two input signals.

14. The system of claim 1 further comprising an output filter configured to reduce effects exhibited by the output signal caused by low frequency phase drift of at least one of the input signals, the phase drift being due to one or more environmental disturbances.

15. The system of claim 14 further comprising a sampler for generating a random digital signal by sampling the output signal, and wherein reducing the effects of phase drift enables the sampler to employ a sampling time interval that is smaller than a coherence time of at least one of the input signals.

16. The system of claim 1 wherein at least one of the input signals is an electromagnetic signal.

17. The system of claim 16 wherein the electromagnetic signal is an optical signal.

18. The system of claim 1 further comprising a splitter for splitting a single source signal from the at least one signal source into the corresponding signal paths to generate at least a first input signal and a second input signal, and wherein the corresponding signal paths provide at least the second input signal to the mixer with a time delay relative to the first input signal.

19. The system of claim 18 wherein the corresponding signal paths a path length difference from the splitter to the mixer, and the time delay between the first and the second input signals being provided to the mixer is due to the path length difference.

20. The system of claim 18 further comprising a sampler configured to generate a random digital signal by sampling the output signal, and wherein the sampler employs a sampling time interval that is greater than the time delay between the first and the second input signals being provided to the mixer.

21. The system of claim 1 wherein the at least one signal source is a laser.

22. The system of claim 1 wherein the at least one signal source comprises a broadband signal source and a passband filter.

23. The system of claim 1 further comprising a respective signal source supplying each of the at least two input signals to the corresponding signal path.

24. A quantum cryptography system comprising the system of claim 1 for generation of a random key to be encoded in quantum bits.

25. A method of generating a random signal, the method comprising:

supplying at least two input signals, each of the at least two of the input signals exhibiting phase variations induced by quantum noise present in at least one source of the at least two input signals; and interfering the at least two input signals to generate an output signal;

wherein the output signal exhibits random intensity variation that is a function of the quantum noise induced phase variations exhibited by the at least two input signals.

26. The method of claim 25 further comprising:

sampling the output signal to obtain a plurality of samples of the output signal, each of the plurality of samples having a respective value dependent on the random intensity variation of the output signal; and generating a random digital signal based on the plurality of samples.

27. The method of claim 26 wherein generating the random digital signal comprises:

for each of the plurality of samples, determining which of a plurality of value ranges a value of the corresponding sample falls within, wherein the probability of a given sample value falling within a given value range is equal for all of the value ranges; and generating the random digital signal based on the plurality of determinations.

28. The method of claim 26 further comprising reducing the effects of phase drift of at least one of the input signals, the phase drift being due to environmental disturbance, wherein reducing the effects of phase drift enables the output signal to be sampled with a sampling time interval that is smaller than a coherence time of at least one input signal.

29. The method of claim 26 wherein the at least two input signals are generated from a single source signal provided by the at least one source that is split into the at least two input signals, and wherein a time delay between the at least two input signals is introduced prior to interfering, and wherein generating the random digital signal comprises sampling the output signal at a time interval that is greater than the time delay introduced between the at least two input signals.

* * * * *